(No Model.)
D. C. FISCHEL.
DETACHABLE COVER FOR UMBRELLAS OR PARASOLS.
No. 414,861. Patented Nov. 12, 1889.
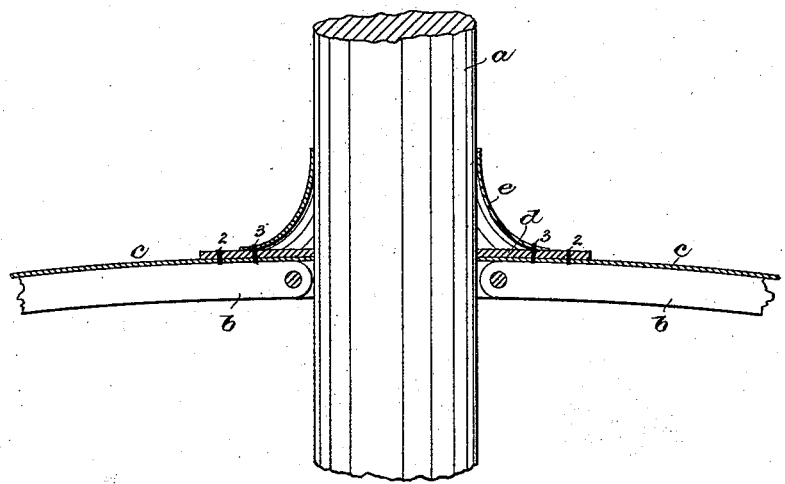
Witnesses
Edgar A. Goddin
Frederick L. Emery
Inventor.
Daniel C. Fischel,
by Crosby & Gregory Attys

UNITED STATES PATENT OFFICE.

DANIEL C. FISCHEL, OF TROY, NEW YORK, ASSIGNOR TO ANDREW J. ROBINSON, OF BOSTON, MASSACHUSETTS.

DETACHABLE COVER FOR UMBRELLAS OR PARASOLS.

SPECIFICATION forming part of Letters Patent No. 414,861, dated November 12, 1889.

Application filed April 29, 1889. Serial No. 309,015. (No model.)

*To all whom it may concern:*

Be it known that I, DANIEL C. FISCHEL, of Troy, county of Rensselaer, State of New York, have invented an Improvement in Detachable Covers for Umbrellas or Parasols, of which the following description, in connection with the accompanying drawing, is a specification, like letters on the drawing representing like parts.

This invention has for its object to improve the construction of detachable covers for umbrellas and parasols.

In accordance with this invention the cover is made of textile material of any suitable shape and size, it being provided with means for attaching it to the ends of the bows, and also to the stick.

The means herein shown for attaching the cover to or holding it firmly in connection with the stick, and which constitutes the essential feature of this invention, consists of a flexible or yielding elastic connection of any kind, although preferably composed of rubber and formed to surround and snugly engage or inclose the stick to present a water-tight connection, and to be connected or attached directly or indirectly with the material of the cover. A metallic collar is preferably employed to assist in holding the flexible connection in place and to add to it strength and rigidity, said metallic collar being held in place by suitable fastenings.

The outer edge of the cover will be attached to the ends of the bows.

The drawing shows in vertical section a portion of an umbrella frame and cover and a yielding connection embodying this invention.

The stick $a$, of any suitable size and shape in cross-section, and the pivoted bows $b$, are all as usual.

The cover $c$ is made of suitable shape to fit accurately, or substantially so, upon the bows when opened.

As a means of attaching the outer edge of the cover to the ends of the bows, I may employ sockets formed to receive the ends of the bows or rings formed to pass through eyes formed in the ends of the bows or any other well-known or suitable fastening.

As a means for attaching or holding the cover firmly on the stick, I employ a flexible elastic connection, herein shown as a gasket or washer $d$, preferably composed of rubber and formed to directly and snugly fit the stick. The flexible washer or gasket $d$ is attached to the cover $c$ in any suitable manner, as by stitches 2. To add strength, durability, and rigidity to the said yielding elastic connection, and to assist in holding it in place, I employ a metallic collar or shield $e$, which surrounds or incloses the stick and rests on the connection, said collar or shield being held in place by fastenings, as 3, or otherwise. The connection, being made of rubber or equivalent flexible and elastic material, readily yields to compensate for sticks of various sizes, and by coming in direct contact with the stick thereby effectually prevents water from running down the stick and insures a water-tight joint.

I claim—

1. A detachable cover for umbrellas and parasols, having means—such as sockets—by which the outer edge may be attached to or connected with the bows, combined with a flexible or yielding elastic connection attached to or connected with the cover, and having a thin contacting edge adapted to encircle the stick in direct contact therewith, substantially as described.

2. A detachable cover for umbrellas and parasols, having means—such as sockets—by which the outer edge may be attached to or connected with the bows, combined with a flexible elastic connection having a thin contacting edge surrounding the stick and contacting therewith to insure a water-tight joint and a metallic collar or shield resting on or joined to said connection, substantially as described.

In testimony whereof I have signed my name to this specification in the presence of two subscribing witnesses.

DANIEL C. FISCHEL.

Witnesses:
GEORGE C. LECONTE,
MICHAEL H. MYERS.